3,036,056
PREPARATION OF POLYMERS OF CONJUGATED DIENES
Pat F. Rion, Borger, Tex., assignor to Phillips Petroleum Company, a corporation of Delaware
Filed Nov. 4, 1958, Ser. No. 771,875
14 Claims. (Cl. 260—94.7)

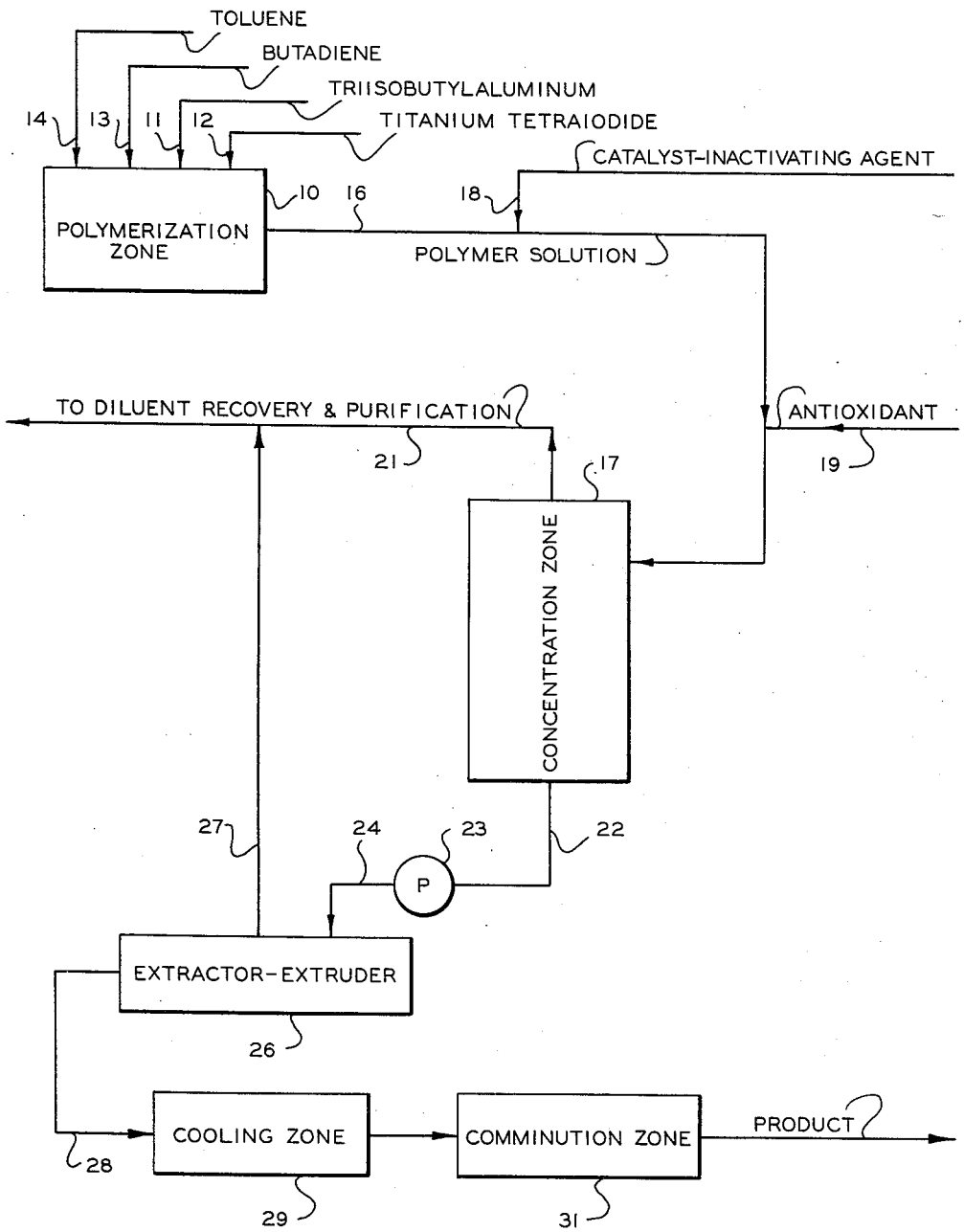

This invention relates to a process for the production of solid polymers of conjugated dienes. In one aspect, it relates to a process in which a conjugated diene is polymerized with certain specific catalysts in the presence of a diluent, and a rubbery or resinous polymer, substantially free of diluent, is recovered as the product of the process.

In recent years, a large amount of research work has been conducted with the view of producing improved rubbery polymers. Great advances have been made quite recently in this field as the result of the discovery of new catalyst systems. These catalyst systems are often described as being "stereospecific" since they are capable of polymerizing monomers, particularly conjugated dienes, to a certain geometric configuration. For example, by the use of certain of these catalyst systems, it is now possible to prepare, as desired, a butadiene polymer of very high cis 1,4-, trans 1,4- or 1,2(vinyl) content. The polymerization processes employing these novel catalyst systems are generally conducted in the presence of an inert diluent which makes it ncessary to separate the rubbery polymer from the diluent upon completion of the polymerization. Since these processes require the handling of polymer solutions, large amounts of diluent must be used in order that the viscosity of the solutions will not be so high as to render their handling difficult. It is also necessary that the diluents used in these polymerization processes be of an extremely high purity. Since most of the diluents are comparatively expensive hydrocarbons, it is important that the diluent be recovered after its separation from the polymer. It is also highly important that substantially all of the diluent be removed from the rubbery polymer products in order that the excellent physical properties of the polymer may be realized to their fullest extent.

It is, therefore, an object of this invention to provide a novel process for the preparation and recovery of rubbery polymers of conjugated dienes.

Another object of the invention is to provide a process in which a conjugated diene is polymerized with certain specific catalyst systems in the presence of a diluent, and a rubbery polymer, substantially free of diluent, is recovered as the product of the process.

A further object of the invention is to provide an improved process for polymerizing conjugated dienes with a catalyst comprising an organometal or a metal hydride in the presence of a hydrocarbon diluent in which substantially all of the diluent is recovered for reuse in the process.

Other and further objects and advantages of the invention will become apparent to those skilled in the art upon consideration of the accompanying disclosure and the drawing which is a flow diagram illustrating the process of this invention.

The instant invention is concerned with a process in which conjugated dienes are polymerized in the presence of a diluent, and a solid polymer, substantially free of diluent, is recovered as the product of the process. Broadly speaking, the process comprises the steps of polymerizing a monomeric material comprising a conjugated diene with a catalyst comprising an organometal or a complex metal hydride in the presence of a diluent, concentrating the polymer solution recovered from the polymerization by removing a portion of the diluent, passing the concentrated solution into an extraction-extrusion zone, and recovering polymer, substantially free of diluent, from this zone. From the foregoing statement of the invention, it is seen that the instant process includes three principal steps or stages, namely, the polymerization stage, the polymer solution concentration stage, and the final product recovery stage. In carrying out the process, it is usually desirable after the polymerization stage and before the concentration stage to add stabilizers or antioxidants to the polymer solution and to treat the polymer solution in order to inactivate the catalyst.

The monomeric material which is polymerized to solid polymers by the process of this invention comprises conjugated dienes containing from 4 to 10 inclusive, carbon atoms. Examples of conjugated dienes which can be used include 1,3-butadiene, 2-methyl-1,3-butadiene (isoprene), 2,3-dimethyl-1,3-butadiene, 1,3-pentadiene, 2-methyl-1,3-pentadiene, 2,3 - dimethyl-1,3-pentadiene, 3-methyl-1,3-pentadiene, 2-phenylbutadiene, and the like.

This invention is applicable to the polymerization of the above-defined conjugated dienes either alone or in admixture with each other and/or with one or more other compounds containing an active $CH_2=C<$ group which are copolymerizable therewith. Included among these latter compounds are aliphatic 1-olefins having up to and including 8 carbon atoms per molecule, such as ethylene, propylene, 1-butene, 1-hexene, and 1-octene. Branched chain olefins, such as isobutylene, can be used as well as 1,1-dialkyl-substituted and 1,2-dialkyl-substituted ethylenes, such as butene-2, pentene-2, hexene-2, heptene-2, 2-methylbutene-1, 2-methylhexene-1, 2-methylheptene-1, and the like. Other olefins which can be used include di- and polyolefins, such as 1,5-hexadiene, 1,4-pentadiene and 1,4,7-octatriene, and cyclic olefins, such as cyclohexene. Other examples of compounds containing an active $CH_2=C<$ group which are copolymerizable with one or more of the conjugated dienes are styrene, acrylonitrile, methacrylonirtile, methyl acrylate, methyl methacrylate, vinyl acetate, vinyl chloride, vinylidene bromide, 2-methyl-5-vinylpyridine, 2-vinylpyridine, 3-vinylpyridine, 3-vinyltoluene, 1-vinylnaphthalene, 2-vinylnaphthalene, 4-vinyltoluene, and the like.

The catalyst used in the polymerization stage of the process of this invention can be broadly defined as comprising a member selected from the group consisting of organometals and complex metal hydrides. The organometals and the complex metal hydrides are often used in admixture with certain metal compounds as will become apparent hereafter from the description of catalyst systems containing two components.

One particularly effective catalyst for use in the polymerization comprises an organometal compound corresponding to the formula $R(Li)_x$, wherein R is a hydrocarbon radical selected from the group consisting of aliphatic, cycloaliphatic and aromatic radicals and combinations of these radicals, and $x$ is an integer from 1 to 4, inclusive. The R group has a valence equal to the integer $x$ and preferably contains from 1 to 20, inclusive, carbon atoms, although it is within the scope of the invention to use higher molecular weight compounds. Examples of organolithium compounds which can be used include methyllithium, isopropyllithium, n-butyllithium, tert-octyllithium, n-decyllithium, phenyllithium, naphthyllithium, 4-butyl-phenyllithium, p-tolyllithium, 4-phenyl-butyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithiobutene - 2, 1,8 - dilithio-3-decene, 1,4-dilithiobenzene, 1,5-dilithionaphthalene, 1,2-dilithio-1,2-diphenylethane, 1,5-dilithioanthracene, 1,3-dilithio-1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5-8-tetralithiodecane, 1,5,10,20-tetralithioeicosane, 1,2,4,6-tetralithiocyclohexane, 1,2,3,5-tetralithio-4-hexylanthracene and the like.

When employing a two-component catalyst system to polymerize conjugated dienes according to this invention, one component is an organometal or a complex metal hydride and the second component is a halide of certain Group IV to VI and VIII metals (Mendelyeev's Periodic System). The organometal compounds referred to include, without limitation, alkyl, cycloalkyl, aryl, alkaryl, aralkyl, alkylcycloalkyl, or cycloalkylalkyl compounds of di-, tri-, or tetravalent metals, particularly Group I, II, III, or IV–B metals, such as sodium, potassium, lithium, rubidium, cesium, magnesium, cadmium, mercury, zinc, barium, lead, tin, aluminum, boron, gallium, indium, and beryllium. The organo groups can be quite large compounds being applicable which have 15 or more carbon atoms in each group and 40 or more carbon atoms in the molecule. These organometals can be advantageously represented by the general formula $R_nM$ wherein R is one of the aforementioned organo radicals, M is a Group I, II, III or IV–B metal, and $n$ is equal to the valence of the metal M. Examples of such organometal compounds include trimethylaluminum, triethylaluminum, triisobutylaluminum, tri-n-butylaluminum, tri-n-hexylaluminum, tri-n-octylaluminum, tri-n-dodecylaluminum, triphenylaluminum, triphenylgallium, diphenylberyllium, dicyclohexylberyllium, diethylzinc, tetraethyllead, tetraphenyllead, tetraethyltin, and the like.

The complex metal hydrides which can be employed as catalyst components can be represented by the general formula $M'M''H_4$ wherein M' is an alkali metal and M'' is aluminum or boron. Specific examples of suitable hydrides are lithium aluminum hydride, sodium aluminum hydride, potassium aluminum hydride, lithium borohydride, sodium borohydride, and the like.

As previously mentioned, the two-component catalyst systems used in the process of this invention include halides of certain metals of Group IV to VI and VIII of the periodic system in addition to the above described organometals and complex metal hydrides. More specifically, halides of titanium, zirconium, vanadium, niobium, molybdenum and cobalt can be advantageously employed. Of the metal halides, it is preferred to use the chlorides and iodides in the catalyst system. Specific examples of suitable metal halides include titanium tetarchloride, titanium tetraiodide, zirconium tetrachloride, vanadium tetrachloride, niobium triiodide, molybdenum penttachloride, and cobaltous iodide.

Examples of preferred catalyst systems in accordance with the foregoing disclosure are as follows:

(a) Aluminum trialkyls, e.g., triethylaluminum or triisobutylaluminum, and titanium tetrachloride or titanium tetraiodide;

(b) Molybdenum pentachloride and an organometal compound such as diethylzinc or diisobutylmercury;

(c) A complex metal hydride, such as lithium aluminum hydride, and a Group IV metal halide, such as titanium tetraiodide or titanium tetrachloride;

(d) A complex metal hydride, such as lithium aluminum hydride, and niobium triiodide; and (e) A complex metal hydride, such as lithium aluminum hydride and a cobaltous halide, such as cobaltous iodide.

While the catalyst described hereinabove has been indicated to be a two-component catalyst system, it is to be understood that the catalyst can include mixtures of the various catalyst components. For example, a particularly suitable catalyst for use in the polymerization has been found to be one which includes an organometal, such as a trialkylaluminum, titanium tetraiodide and titanium tetrachloride.

The polymerization stage of the process of this invention is carried out in the presence of a hydrocarbon diluent which is not deleterious to the catalyst system. Examples of suitable diluents include aromatic, paraffinic, and cycloparaffinic hydrocarbons, it being understood that mixtures of these materials can also be used. Specific examples of suitable hydrocarbon diluents include benzene, toluene, xylene, n-butane, isobutane, n-pentane, iso-octane, n-dodecane, cyclopentane, cyclohexane, methylcyclohexane, and the like. It is usually preferred to employ aromatic hydrocarbons as the diluent. It is also within the scope of the invention to employ in admixture with the hydrocarbon diluent polar compounds which do not inactivate the organolithium catalyst. When employing an organolithium compound as the catalyst, it has been found that the use of polar compounds in admixture with the hydrocarbon diluent increases the reaction rate of the polymerization process of this invention. Examples of polar compounds which do not inactivate the organolithium catalyst and which may, therefore, be utilized with the hydrocarbon diluents are ethers, thioethers (sulfides), and tertiary amines. Specific examples of such polar materials include dimethyl ether, diethyl ether, ethyl methyl ether, ethyl propyl ether, di-n-propyl ether, di-n-octyl ether, tetramethylene oxide (tetrahydrofuran), dioxane, paraldehyde, anisole, 1,2-dimethoxyethane, dibenzyl ether, diphenyl ether, dimethyl sulfide, diethyl sulfide, di-n-propyl sulfide, di-n-butyl sulfide, methyl ethyl sulfide, dimethylethylamine, tri-n-propylamine, tri-n-butylamine, trimethylamine, triethylamine, N,N-dimethylaniline, pyridine, quinoline, N-ethylpiperidine, N-methyl-N-ethylaniline, N-methylmorpholine, and the like. It is to be understood also that mixtures of these polar compounds can be employed in the practice of the instant inventtion. When a polar compound is used in admixture with the hydrocarbon diluent, the polar compound is usually present in an amount in the range of 0.005 to 50 percent by weight of the total solvent mixture.

The polymerization stage of the process of this invention can be carried out at any temperature within the rage of about −110 to 300° F., but it is preferred to operate in the range of −5 to 180° F. The polymerization reaction can be carried out under autogenous pressures. It is usually desirable to operate at pressures sufficient to maintain the monomeric material substantially in the liquid phase. The pressure will thus depend upon the particular material being polymerized, the diluent being employed, and the temperature at which polymerization is conducted. However, higher pressures can be employed if desired, these pressures being obtained by some such suitable method as the pressurization of a reactor with a gas which is inert with respect to the polymerization reaction. The polymerization according to this invention is generally carried out in the liquid phase. However, depending upon the diluent and polymerization temperature selected, the polymerization can be conducted in the solid phase. When operating in the solid phase, it is to be realized that the temperature of the reaction mixture is increased upon completion of the polymerization so that the polymer is in solution in the diluent upon removal from the polymerization zone. In general, the rubbery polymers are in solution in the hydrocarbon diluents at room temperature.

The amount of the catalyst which is used in the polymerization stage of the process of this invention can vary over a rather wide range. When utilizing an organolithium compound, at least 0.05 part by weight of this material per 100 parts by weight of the monomer is usually employed. A preferred catalyst level is from 0.1 to 2 parts by weight of the organolithium compound per 100 parts by weight of monomers charged to the polymerization zone. When utilizing a catalyst comprising an organometal compound, the amount of the organometal used in the catalyst composition is usually in the range of 1.0 to 15 mols per mol of the metal halide. However, a preferred mol ratio is from 2.5:1 to 8:1 of the organometal compound to the metal halide. The concentration of the total catalyst composition, i.e., organometal and metal halide, is usually in the range of 0.05 to 10 weight percent, preferably in the range of 0.05 to 5 weight percent, based on the total amount of monomer charged to the polymerization zone. When a catalyst comprising a complex metal hydride and a metal halide is employed in the polymerization, the amount of complex metal hydride used in the catalyst composition is usually in the range of 0.5 to 6 mols per mol of metal halide. However, a preferred ratio is from 1.3 to 3.0 mols of the complex metal hydride per mol of metal halide. The amount of this latter catalyst used in the polymerization is usually in the range of about 0.10 weight percent to 10 weight percent or higher, preferably in the range of 0.25 weight percent to 7 weight percent, based on the total amount of monomer charged to the polymerization zone.

Upon completion of the polymerization stage, which generally requires less than 100 hours and often less than 50 hours, the polymer solution is preferably admixed with a suitable stabilizing material. Conventional antioxidants and stabilizers which are usually used with natural or synthetic rubbers, such as phenyl-beta-naphthylamine, can be utilized. Prior to concentrating the polymer solution recovered from the polymerization, the solution is also treated with a material such as an alcohol, a mineral acid or water in order to inactivate the catalyst. If the catalyst-inactivating agent such as sulfuric acid is employed, it is usually desirable to wash the polymer solution several times with water after such treatment in order to remove residual acid traces.

After the addition of the stabilizer and the catalyst-inactivating agent, the polymer solution is then concentrated by any suitable means. In the usual polymerization using one of the catalyst systems described hereinbefore, the ratio of diluent to monomer on a weight basis is in the range of 8:1 to 16:1. Since conversions of from 90 to 100 percent are often obtained, solutions containing from 5 to 10 weight percent polymer are usually recovered from the polymerization. These polymer solutions in accordance with the process of this invention are then concentrated so as to obtain a solution containing at least 15 weight percent polymer. While the polymer solutions recovered from the polymerization can be concentrated to a polymer content above 40 weight percent, this 40 percent figure appears to be the practical upper limit of polymer content to which the solution can be concentrated. Concentration of the solution to above about 40 weight percent of polymer results in a solution having a viscosity which is too high for convenient handling. It is to be understood that the concentrated polymer solution is free of any suspended or precipitated solid polymer. While the polymer solution can be concentrated by any suitable method, it is generally preferred to carry out this operation by evaporating off the desired amount of diluent.

Upon completion of the concentration stage of the process of this invention, the polymer solution is then introduced into an extractor-extruder. In this apparatus, substantially all of the remaining diluent is removed from the polymer solution. A diluent-free rubbery polymer is withdrawn from the product end of the extractor-extruder.

A better understanding of the invention can be obtained by referring to the drawing which is a flow diagram illustrating the several stages of the present process. While the process will be described with relation to the polymerization of butadiene with a specific catalyst system in the presence of a particular diluent, it is, of course, evident from the foregoing disclosure that it is not intended to so limit the invention. As shown in the drawing, the catalyst components, namely, triisobutylaluminum and titanium tetraiodide, are introduced separately into polymerization zone 10 through lines 11 and 12. Butadiene is charged to the polymerization zone through line 13 while the diluent toluene is added by means of line 14. In zone 10 polymerization occurs at a temperature of about 86° F., and the polymerization is allowed to continue until a conversion of 90 percent is obtained. A solution of rubbery polymer in toluene is then withdrawn from the polymerization zone through line 16 and passed into concentration zone 17. A small amount of a catalyst-inactivating agent, such as water, is introduced into the polymer solution flowing through line 16 by means of line 18. A small amount of a solution of an antioxidant, such as phenyl-beta-naphthylamine, in toluene is thereafter added to the polymer solution through line 19.

In concentration zone 17, the polymer solution containing, e.g., about 10 weight percent of polymer is concentrated to a solution containing about 20 weight percent of polymer by removing the necessary amount of toluene from the solution. This is accomplished by heating the solution in the concentration zone to slightly above the boiling point of toluene (232° F.), and thereby evaporating toluene from the solution. Any temperature above the boiling point of the diluent can be employed so long as the temperature is not high enough to cause degradation of the polymer. This evaporated toluene, which is withdrawn from concentration zone 17 through line 21, is then passed to a suitable recovery and purification zone (not shown). The diluent recovery and purification zone can include, for example, distillation and filtration equipment suitable for purifying the diluent prior to its reuse in the process. The concentrated polymer solution containing about 20 weight percent polymer is recovered from the lower portion of concentration zone 17 through line 22. The material is then pumped by means of pump 23 through line 24 into extractor-extruder 26. This apparatus is provided with an agitation or kneading device, such as one or more screw conveyors, and is further equipped with one or more outlets in the form of constricted openings or dies through which softened polymer can be extruded. An outlet opening is also located in an intermediate section of the apparatus through which vaporized materials can be removed. It is often advantageous to apply a vacuum at this outlet opening in order to assist in the removal of vaporizable materials. Any suitable commercial extractor-extruder can be utilized in the practice of this invention. A description of apparatus which can be employed is contained in Re. 23,948, reissued on February 15, 1955. In the extractor section of the extractor-extruder, the remainder of the toluene in the concentrated polymer solution is vaporized by the heat generated by the rotating screw conveyors in working and kneading the materials. The apparatus may also be provided with a heating jacket which assists in maintaining the polymeric material in a softened condition and in vaporizing the diluent. A temperature at least as high as the boiling point of the diluent is maintained in the extractor-extruder. The extractor-extruder temperature usually falls in the range of 250 to 400° F., although it is preferred to operate between 280 and 320° F. The residence time of the polymer in the extractor-extruder can be readily adjusted to ensure that all of the diluent is vaporized. The vaporized diluent recovered from the extractor-extruder through line 27 is also passed to the recovery and purification zone for further treatment. The polymer remaining in the extractor-extruder after the vaporization of the toluene, then passes through the extrusion section of the apparatus. A stabilized rubbery butadiene polymer of approximately 95 percent cis 1,4 content and containing less than 1 weight percent toluene, based on the polymer, is discharged from the product end of the extractor-extruder as a strand or series of strands represented in the drawing by numeral 28. The strands are then treated in a cooling zone 29 after which the cooled strands are passed into comminution zone 31 wherein they are converted to a comminuted form suitable for bagging or bulk storage. The cooling zone can include any suitable cooling equipment, e.g., a drum drier having a chilled surface over which the strands are passed. The polymer strands can also be cooled merely by blowing cool air over them. Any suitable equipment capable of cutting or shredding the cooled polymer strands, such as a chopper or a rotating blade cutter, can be used in the comminution zone.

The process of this invention is particularly applicable to the production and recovery of rubbery polymer of conjugated dienes. However, it is to be understood that resinous polymers of conjugated dienes can also be produced in the polymerization and that this type of polymer can be recovered by the present process. The term "rubbery polymer" includes elastomeric, vulcanizable, polymeric material which after vulcanization, i.e., cross-linking, possesses the properties normally associated with vulcanized rubber including materials which when compounded and cured exhibit reversible extensibility at 80° F. of over 100 percent of a specimen's original length with a retraction of at least 90 percent within one minuter after release of the stress necessary to elongate to 100 percent. The rubbery polymers produced in accordance with this invention can be compounded by any of the known methods such as have been used in the past for compounding natural rubber. Vulcanization accelerators, reinforcing agents, and fillers such as have been employed in natural rubber can likewise be used in the compounds of this invention. The rubbery polymers have utility in applications where natural and synthetic rubbers are used. For example, they can be used in the manufacture of automobile tires, gaskets, and other rubber articles.

A more comprehensive understanding of the invention can be obtained by referring to the following illustrative example which is not intended, however, to be unduly limitative of the invention.

*Example*

A run was made in accordance with the process of this invention in which butadiene was polymerized in the presence of triisobutylaluminum and titanium tetraiodide, and rubbery polymer, substantially free of diluent, was recovered as the product of the process.

In this run, technical grade toluene was passed downwardly through a 6" x 10' column, packed with ½" Berl saddles, countercurrent to a stream of dry nitrogen. The toluene feed rate was 4 pounds per minute, and the nitrogen rate was 4 cubic feet per minute. The stripped toluene was collected in a 70-gallon tank, after which it was passed through an activated alumina column and charged to the polymerization reactor in the desired amount.

The butadiene used in this run was dried by circulating the material through a series of silica gel columns. The desired amount of butadiene for reactor charging was distilled into an 18-gallon weighing cylinder from which it was charged to the reactor. The butadiene so introduced into the reactor contained 50 p.p.m. water.

Triisobutylaluminum was diluted with dry toluene to form a solution containing 25 weight percent triisobutylaluminum (based on aluminum analysis). The desired amount of this material was pressured into the reactor from a stainless steel bomb. The titanium tetraiodide was micropulverized under a blanket of nitrogen, and the resulting finely divided material was dispersed in dry toluene in a glass lined vessel to form a dispersion containing 1.0 percent by weight titanium tetraiodide. The desired amount of this material was transferred to a stainless steel bomb from which the material was charged to the reactor.

The recipe for this run was as follows:

| | Parts by weight |
|---|---|
| Butadiene | 100 |
| Toluene | 1200 |
| Triisobutylaluminum | 0.60 |
| Titanium tetraiodide | 0.448 |

The initiation temperature for the polymerization was 4° F., while the maximum temperature reached during the run was 45° F. The major portion of the run was carried out at a temperature of 20° F. After two hours, the conversion was 68 percent, while at the end of the 19 hours, at which time the run was terminated, the conversion was 92 percent. At the end of this time, the reaction mixture was pressured from the reactor into a 250-gallon blowdown tank containing water which inactivated the catalyst. Two parts per hundred parts of polymer of phenyl-beta-naphthylamine was then added to the polymer solution as a 2 weight percent solution in toluene. The polymer solution was then treated with an equal volume of dilute aqueous sulfuric acid at 180° F., this acid solution containing 10 parts by weight of sulfuric acid per 100 parts by weight of polymer. The polymer solution was then cooled and washed twice with an equal volume of water at room temperature.

A portion of this polymer solution was then concentrated to 16.4 weight percent solids by charging to a laboratory flask, heating and evaporating toluene. This concentrated material, containing dissolved polymer, had a Brookfield viscosity of 10,000 centipoises at 140° F. A 4-section extractor-extruder was then used to process the concentrated polymer solution. The cover on the extraction section was removed, and the concentrated material was fed directly into the extraction section. Oil at a temperature of 400° F. was circulated through the jacket with which the apparatus was provided. The worms readily advanced the material through the apparatus, and the vaporized solvent left the apparatus through the opening into the extraction section. The polymer which was extruded contained only a small amount of residual solvent. By increasing the residence time of the polymer in the extraction section, a polymer product can readily be obtained which contains no solvent.

The polymer which was processed as described above was a 30 (ML-4) Mooney rubber and had a cis-1,4 content of approximately 95 percent.

It will be evident to those skilled in the art that many variations and modifications can be practiced upon consideration of the foregoing disclosure. Such variations and modifications are believed to be within the spirit and scope of the present invention.

I claim:

1. In a process for preparing polymers of conjugated dienes in which a conjugated diene is polymerized by contacting in the presence of a hydrocarbon diluent a catalyst comprising a member selected from the group consisting of metal hydrides and organometals and a solution of polymer in said hydrocarbon diluent is obtained, the improvement which comprises concentrating said polymer solution by removing therefrom a portion of said hydrocarbon diluent so as to obtain a concentrated polymer solution containing not more than about 40 weight percent polymer; passing the said concentrated polymer solution free of any precipitated solid polymer into an extraction-extrusion zone wherein said polymer is heated and worked; and recovering from said zone polymer which is substantially free of any of said hydrocarbon diluent.

2. In a process for preparing rubbery polymers of conjugated dienes containing from 4 to 10, inclusive, carbon atoms in which a conjugated diene is contacted in a polymerization zone in the presence of a hydrocarbon diluent with a catalyst selected from the group consisting of (1) a compound corresponding to the formula $RLi_x$, wherein R is a hydrocarbon radical selected from the group consisting of aliphatic, cycloaliphatic and aromatic radicals and $x$ is an integer from 1 to 4, inclusive, and (2) mixtures obtained by mixing at least two essential components, one of said components being selected from the group consisting of metal hydrides and organometals and the other of said components being a metal compound selected from the group consisting of group IV, group V, group VI and group VIII metal compounds, the improvement which comprises withdrawing from said polymerization zone a solution of polymer in said hydrocarbon diluent; passing said polymer solution into a concentration zone; heating said polymer solution in said concentration zone to a temperature at least as high as the boiling point of said hydrocarbon diluent; withdrawing vaporized hydrocarbon diluent from said concentration zone; withdrawing concentrated polymer solution free of any precipitated solid polymer and containing in the range of about 15 to about 40 weight percent polymer from said concentration zone; passing said concentrated polymer solution into an extraction-extrusion zone; withdrawing vaporized hydrocarbon diluent from said extraction-extrusion zone; and withdrawing from said extraction-extrusion zone polymer which is substantially free of said hydrocarbon diluent.

3. A process according to claim 2 in which said conjugated diene is 1,3-butadiene.

4. A process according to claim 2 in which said conjugated diene is isoprene.

5. A process according to claim 3 in which said catalyst comprises butyllithium.

6. A process according to claim 3 in which said catalyst comprises triethylaluminum and titanium tetrachloride.

7. A process according to claim 3 in which said catalyst comprises triisobutylaluminum and titanium tetraiodide.

8. A process according to claim 3 in which said catalyst comprises lithium aluminum hydride and titanium tetraiodide.

9. A process according to claim 3 in which said catalyst comprises molybdenum pentachloride and diethylzinc.

10. In a process for preparing rubbery polymers of conjugated dienes containing from 4 to 10, inclusive, carbon atoms in which a conjugated diene is contacted in a polymerization zone in the presence of a hydrocarbon diluent with a catalyst selected from the group consisting of (1) a compound corresponding to the formula $RLi_x$, wherein R is a hydrocarbon radical selected from the group consisting of aliphatic, cycloaliphatic and aromatic radicals and $x$ is an integer from 1 to 4, inclusive, and (2) mixtures obtained by mixing at least two essential components, one of said components being selected from the group consisting of metal hydrides and organometals and the other of said components being a metal compound selected from the group consisting of group IV, group V, group VI and group VIII metal compounds, the improvement which comprises withdrawing from said polymerization zone a polymer solution containing from 5 to 10 weight percent of polymer, passing said polymer solution into a concentration zone; heating said polymer solution in said concentration zone to a temperature at least as high as the boiling point of said hydrocarbon diluent; withdrawing vaporized hydrocarbon diluent from said concentration zone; withdrawing concentrated polymer solution free of any precipitated solid polymer containing from 20 to 40 weight percent polymer from said concentration zone; passing said concentrated polymer solution into an extraction-extrusion zone which is maintained at a temperature in the range of 250 to 400° F.; withdrawing vaporized hydrocarbon diluent from said extraction-extrusion zone; and withdrawing from said extraction-extrusion zone polymer which is substantially free of said hydrocarbon diluent.

11. A process according to claim 10 in which said polymer withdrawn from said extraction-extrusion zone contains less than 1 weight percent hydrocarbon diluent, based on said polymer.

12. A process according to claim 10 in which said polymer withdrawn from said extraction-extrusion zone is passed into a cooling zone wherein said polymer is cooled and said cooled polymer is thereafter passed into a comminution zone wherein said polymer is converted to a comminuted form.

13. A process according to claim 10 in which said extraction-extrusion zone is maintained at a temperature in the range of 280 to 320° F.

14. A process according to claim 10 in which a catalyst-inactivating agent and an antioxidant are added to said polymer solution prior to its introduction into said concentration zone.

References Cited in the file of this patent

UNITED STATES PATENTS

| | | |
|---|---|---|
| 2,833,750 | Vickers | May 6, 1958 |
| 2,849,432 | Kibler et al. | Aug. 26, 1958 |
| 2,897,184 | Kimble | July 28, 1959 |

FOREIGN PATENTS

| | | |
|---|---|---|
| 538,782 | Belgium | Dec. 6, 1955 |